3,028,348
PROCESS FOR THE MANUFACTURE OF SYNTHETIC RESINS OBTAINED BY CONDENSATION AND ESTERIFICATION
Pierre Castan and Claude Gandillon, Geneva, Switzerland, assignors to Stella S.A., Vernier-Geneve, Switzerland, a corporation of Switzerland
No Drawing. Filed June 1, 1959, Ser. No. 817,031
Claims priority, application Switzerland June 2, 1958
11 Claims. (Cl. 260—19)

Among the resins used in the varnish industry, the resins known as alkyd resins are used most. It may be said that the synthesis thereof is generally carried out starting from saturated or unsaturated higher fatty acids (with more than eight carbon atoms), diacids, such as phthalic acid (or its anhydride), and polyhydric alcohols, such as glycerol or pentaerythritol.

If the reaction is examined in detail, it will be seen that it is sought to obtain with the diacid and the polyalcohol an ester having a relatively high molecular weight and also containing free hydroxyl groups. These groups then react with the fatty acids.

The chain thus formed contains only ester groups which unite the various elements thereof and this causes sensitivity to alkalis even after hardening of the coats of varnish containing these resins by oxidation in the air.

Another method has recently been found of preparing resins having properties similar to those of alkyd resins without exhibiting, in particular, this sensitivity to alkalis.

This method consists in causing diphenols to react in a first stage with derivatives of glycerol, such as epichlorohydrin or α-α-dichlorohydrin in alkaline solution. In this way there is formed a resinous polyalcohol which contains both hydroxyl groups and epoxy groups. In the second stage, saturated or unsaturated fatty acids are reacted with the resinous polyalcohol. The hydroxyl groups esterify normally; the epoxy groups react by addition of a fatty acid molecule, and then there is substitution of the hydroxyl formed, with elimination of water.

The esters thus obtained permit of preparing varnishes which dry in the air if unsaturated fatty acids, such as the acids of linseed oil, soya bean oil, etc., are used. The drying takes place under the action of normal and conventional driers, e.g. combinations of lead, cobalt, or manganese. The drying is very rapid and the coats obtained harden rapidly and have a resistance greater than that offered by conventional alkyds.

If saturated acids are employed, resins are obtained which can be combined with urea-formaldehyde or melamine-formaldehyde resins to prepare resins hardening in the kiln.

The present invention consists in a process for the manufacture of synthetic resins obtained by condensation and esterification which is characterised by the fact that a monophenol is reacted with formaldehyde in alkaline solution, the product of low molecular weight thus obtained is condensed with epichlorohydrin in alkaline solution, the substance thus obtained is esterified with fatty acids of high molecular weight and dehydration is carried out by heating in the presence of acid catalysts.

The synthetic resins obtained in this way can be used in particular in the varnish industry.

The process is characterized by the formation of a chain having a base of monophenols and derivatives of glycerol, such as dichlorhydrin or epichlorohydrin, and also of formaldehyde. The bonds between the various elements comprise only carbon-carbon bonds or ether groups. Moreover, this chain carries practically speaking no epoxy groups.

To this end, a monophenol is first condensed with the formaldehyde in alkaline solution. As a rule, all the monophenols are suitable. However, the reaction is very difficult to carry out with phenol or metacresol, because the phenolic alcohols formed have the tendency to condense rapidly into more complicated products.

With ortho-substituted phenols, the reaction is more favourable, but it is sharpest with para-substituted phenols. From 1 to 3 gram-molecules can be taken as the quantity of formaldehyde per phenolic hydroxyl group. However, here too, it is preferable to employ proportions of formaldehyde such that all the positions capable of reacting are occupied.

The condensation with the epichlorohydrin or the α-α-dichlorohydrin is best effected at a temperature in the vicinity of 50–70° C., accompanied by brisk agitation. With regard to the quantities of derivatives of glycerol to be employed, these may be rather varied without the final products being very different. As a general rule, it is possible to take from 0.5 to 1.5 gram-molecules of epichlorohydrin and from 0.5 to 1 gram-molecule of α-α-dichlorohydrin per phenolic hydroxyl.

Once the reaction has been completed, neutralization is carried out by means of an acid and the resin is washed with water until the chlorides have disappeared. The resin is freed of its water by heating to 130° C.

Light yellow resins are thus obtained which have a softening point varying between 50° C. and 85° C., according to the phenol employed and the reaction conditions.

The resins obtained in this way contain practically speaking no phenol groups or epoxy groups. In fact, they are not soluble in alkalis and do not react with polyamines, such as ethylene diamine and diethylene triamine, the customary hardeners for epoxy resins.

The resins obtained in this way can be esterified by merely heating them to a temperature of about 200° C. in the presence of saturated or unsaturated fatty acids. It is advantageous to proceed as follows: the resins are first converted into substances of higher molecular weight by heating in the presence of small quantities of acid catalysts or catalysts having an acid reaction, like those used for this purpose in organic chemistry, such as phosphoric acid, butyl-phosphoric acid, benzenesulphonic acid, toluene sulphonic acid, oxalic acid, boric acid, or zinc chloride. The process is conducted by heating to a temperature varying between 150° and 250° C. in the presence of an inert solvent, such as xylene. The water formed is eliminated by entrainment by means of the solvent vapour. The viscosity of the molten resin increases slowly and the heating is interrupted when the desired consistency is reached. If the heating is far too prolonged, there is a danger of gelatinization. The operation is continued by adding the desired quantity of saturated or unsaturated fatty acids and heating is continued. Water is liberated in a quantity corresponding to the quantity of acids added. The acids thus react solely by esterification and not partially by addition, as is the case when epoxy resins are reacted with fatty acids.

It is also possible to proceed in a different manner by causing dehydration by means of an acid catalyst during or after the esterification. In this case, the quantity of fatty acids must be calculated so that all the hydroxyl groups of the resin are not converted by esterification. In this case also, the dehydration results in the formation of chains containing ether groups. The manner in which the catalyst is added depends on the composition of the reaction mixture, the properties of the final product and the manner in which the reaction is conducted. The dehydration is carried out at a temperature in the vicinity of 200° C. and the quantity of water liberated during the whole of the reaction corresponds to the sum of the water formed by the esterification and the dehydration. The best procedure consists in working in the presence of an inert solvent, such as xylene. The water formed is entrained in the process of formation by the solvent vapour. It is collected in a water trap and the reaction can be followed by measuring the quantity of water liberated.

The resins obtained according to the present invention are soluble in aliphatic hydrocarbons. This solubility in aliphatic hydrocarbons constitutes a certain advantage over the products obtained by esterification of epoxy resins with unsaturated fatty acids, the latter products being generally soluble only in aromatic hydrocarbons. From the practical point of view, this solubility in aliphatic hydrocarbons is a great advantage. As regards the other properties, such as drying and hardening of the drier-containing films, hardness and resistance to alkalis, the two groups are practically identical. In relation to the usual alkyd resins which, in general, are soluble in aliphatic hydrocarbons, the new resins have a much better resistance to aqueous alkaline solutions. The properties of the resins depend in large measure on the kind and quantity of the unsaturated fatty acids employed for manufacture. It must be pointed out that with a fatty acid content of 45 to 50% the films exhibit an excellent elasticity. If saturated fatty acids are employed instead of siccative unsaturated fatty acids, of a mixture thereof with semi-siccative fatty acids, resins are obtained which are compatible with urea or melamine resins and this permits the use thereof for stove enamels.

Example 1

A mixture composed of 150 grams of p-tert-butyl phenol dissolved in 300 grams of 13.5% solution of sodium hydroxide and 185 grams of 36% solution of formaldehyde is allowed to react for two days at room temperature. The mixture is then heated to a temperature of 50°–60° C. while being agitated and 110 grams of epichlorohydrin are introduced in one hour. When the addition has been completed the mixture is agitated for a further 4 hours at 50°–60° C., then neutralized with acetic acid and the resin which has separated is washed with hot water in order to remove the mineral salts. The process is completed by heating the resin to 135° C. to remove the water.

When this operation has been completed, the resin is heated to a temperature of about 180°–200° C. and 0.5 to 2% of butyl-phosphoric acid is added and also xylene in order to remove the water formed. For this purpose, use is made of a reflux condenser connected to a separator enabling the water to be eliminated. When the desired consistency has been obtained, 220 grams of fatty acids of dehydrated castor oil (acid number: about 180) are added and heating is continued at 200°–250° C. During this stage, water is liberated in proportions corresponding to the esterified acids. It is best to perform the process in the presence of xylene and in an inert atmosphere either of nitrogen or of carbonic acid.

The reaction is followed by measuring the acid number of the mixture and the reaction is stopped when the number has dropped below 10 at the minimum. Dilution is then carried out with benzene or white spirit.

After siccativation with cobalt and lead in the form of naphthenate, very slightly coloured, rapidly-drying films are obtained. After 8 days, these films resist 5% aqueous sodium hydroxide for at least 30 minutes. Under the same conditions, films with a base of conventional alkyd resins are destroyed in 5 minutes.

Example 2

As in Example 1, a start is made with 150 grams of p-tert-butyl phenol, 300 grams of 13.5% solution of sodium hydroxide and 185 grams of 36% solution of formaldehyde. After the mixture has been left for 2 days at room temperature, it is heated to 50°–60° C. while being agitated and 72 grams of epichlorohydrin are introduced in 1 hour. After this addition, heating is continued at 50°–60° C. for 3 to 4 hours, the agitation being kept up.

The process is continued as in Example 1 as regards the washing and drying of the resin. The dehydration is effected as in Example 1 and 300 grams of linseed oil acids (acid number: about 200) are then added and esterification is continued until the acid number of the mixture has dropped below 10. Dilution is then carried out with benzene at a temperature of 100°–140° C. and the mixture is treated with cobalt and lead driers containing 0.04% of cobalt and 0.4% of lead (calculated as metal on the resin). The varnish prepared in this way gives films drying in the air and having an excellent resistance to alkalis.

Example 3

198 grams of styryl phenol are dissolved in 400 cc. of 10% solution of sodium hydroxide and 150 grams of 36% solution of formaldehyde are added. After the mixture has been left for 3 days at room temperature, it is heated to 50°–60° C. while being agitated and 120 grams of epichlorohydrin are introduced in 1 hour. After the process of introduction, agitation is carried out for a further 4 hours at the same temperature and the mixture is then neutralized with acetic acid and the resin is washed as in Example 1. The resin is freed from the water by heating to 130° C. and it is then dehydrated by heating to 180°–220° C. in the presence of a little (0.1 to 5%) butylphosphoric acid and an inert solvent, such as xylene.

When the desired consistency has been attained, 272 grams of fatty acids of linseed oil are added and the mixture is heated at 200°–250° C. until an acid number below 10 is obtained. Dilution is then carried out with benzene in order to obtain a concentration of 50–60%. By siccativation with a drier having a cobalt and lead base, a varnish is obtained which gives coats which are dry in 2 to 3 hours. These coats resist 5% solution of sodium hydroxide for 30 minutes.

Example 4

A resin is prepared for p-tert-butyl phenol as in Example 1 and is freed from the water by heating to 135° C.

This resin, about 240 grams, is dehydrated by heating to 200° C. in the presence of a little butylphosphoric acid. When the desired consistency has been attained, 100 grams of coconut oil acids are added. Heating is continued at 200° C., the water formed by the esterification being eliminated, until an acid number of from 10 to 12 is reached. The heating is interrupted and dilution is carried out with white spirit to 50% of dry matter. The resin obtained in this way is compatible with urea-formaldehyde and melamine-formaldehyde resins and gives varnishes which can be hardened in the kiln. After hardening, the films are very flexible and slightly colored.

Example 5

A mixture composed of 300 grams of p-tert-butyl phenol, 400 grams of 20% aqueous sodium hydroxide and 340 cc. of 40% solution by volume of formaldehyde is reacted for 2 days at room temperature.

The mixture is then heated to 50°–60° and 140 grams of epichlorohydrin are added in 1 hour while agitating the mixture briskly. The agitation and the temperature are maintained for 5 hours and the resin is then washed with hot water until the washing water is no longer alkaline and contains no more chlorine.

The water remaining in the resin is eliminated by heating to 135° C. in a vacuum.

330 grams of fatty acids of dehydrated castor oil are then added and also 0.3% of butylphosphoric acid. The melted mass is agitated and the temperature is increased to 200°–230° C. while a stream of inert gas is passed therethrough.

The elimination of the water is effected with xylene and by means of a water trap.

The temperature is maintained until the acid number has dropped below 10. Dilution is then carried out with white spirit and the resin solution is filtered.

Siccativated with cobalt and lead naphthenates used in suitable quantities, the resin solution gives films which dry rapidly in the air and have good resistance to aqueous alkalis.

*Example 6*

300 grams of p-tert-butyl phenol are made into a paste with 140 grams of water and 400 grams of 20% solution sodium hydroxide are added. Heating is carried out with agitation until dissolution is complete and 340 cc. of 40% solution by volume of formaldehyde are added.

The temperature is maintained at 55°–60° C. for 2 hours, while continuing the agitation. After this time, 200 grams of epichlorohydrin are added in 1 hour and heating and agitation are continued for a further 2 hours after the completion of the addition.

Washing and dehydration are carried out as in Example 5.

360 grams of fatty acids of dehydrated castor oil are added to the melted resin and the temperature is increased to 200°–220° C., while agitating. The esterification takes place rapidly and the water formed is carried away by xylene. When the acid number has dropped to 5–6, about 0.5 gram of p-toluenesulphonic acid is added and heating is continued at about 200° C. Dehydration takes place rapidly and can be followed by measuring the quantity of water liberated. The reaction is stopped when the desired viscosity is reached by diluting with white spirit or benzene.

The resin obtained gives films the properties of which are similar to those described in Example 5.

*Example 7*

The same initial resin is prepared as in Example 6 and 200 grams of fatty acids of coconut oil are added. The mixture is heated to 200° C., the water formed by the esterification being eliminated, until the acid number reaches 10 to 12. 0.5 gram of benzenesulphonic acid is then added and heating is continued at 200° C. The water formed by dehydration is eliminated by means of xylene. When the desired viscosity is reached, the heating is stopped and dilution is carried out with xylene.

The resin prepared in this way is compatible with urea-formaldehyde and melamine-formaldehyde resins and thus gives varnishes which can be hardened in the kiln.

We claim:

1. A process for the manufacture of synthetic resins comprising carrying out a first condensation between a monoalkylated monophenol and formaldehyde in a proportion of one molecule of said monoalkylated monophenol and 1 to 3 molecules of formaldehyde in the presence of an alkaline solution containing about 1 molecule of alkali, producing products consisting principally of monomolecular phenolalcohols, carrying out a second condensation in an alkaline solution of said products with epichlorohydrin in a proportion of less than one molecule of epichlorohydrin for each phenol group, the second condensation product thus obtained containing no free phenolic hydroxyl group and no free epoxy group, esterifying said second condensation product with fatty acids of high molecular weight in a proportion of 100 to 300 parts by weight of fatty acid for each 150 parts by weight of monoalkylated monophenol, and effecting an intramolecular dehydration just before, during or after said esterification by heating in the presence of acid catalysts.

2. A process according to claim 1, and in which said condensation of the monophenol with the formaldehyde and the epichlorohydrin is carried out in the hot state.

3. A process according to claim 2 in which said monophenol employed is substituted in the para position.

4. A process according to claim 2, in which there is employed instead of epichlorohydrin a chlorinated derivative of trioxypropane, such as α-α-dichlorohydrin, which gives epichlorohydrin in alkaline solution.

5. A process according to claim 2, in which said condensation products are esterified with unsaturated fatty acids which are derivatives of drying and semi-drying oils.

6. A process according to claim 2, in which said condensation products are esterified with saturated fatty acids which are derivatives of non-drying and semi-drying oils.

7. A process according to claim 2 in which toluenesulphonic acid is employed as acid catalyst.

8. Synthetic resins obtained according to the process claimed in claim 1.

9. Synthetic resins as claimed in claim 8 in which said resins are soluble in aliphatic hydrocarbons.

10. Synthetic resins according to claim 9 having the property to form varnishes drying in the air in the presence of conventional driers and that films thereof resist dilute aqueous alkalis.

11. Synthetic resins according to claim 10 having the property that they are compatible with urea-formaldehyde and melamine-formaldehyde resins and that they give varnishes which can be hardened in the kiln.

References Cited in the file of this patent

UNITED STATES PATENTS

| | | |
|---|---|---|
| 2,506,903 | Smith et al. | May 9, 1950 |
| 2,695,894 | D'Alelio | Nov. 30, 1954 |